(12) United States Patent
Braun

(10) Patent No.: US 7,252,239 B2
(45) Date of Patent: Aug. 7, 2007

(54) METHOD FOR PRODUCING LASER-WRITABLE DATA CARRIERS AND DATA CARRIER PRODUCED ACCORDING TO THIS METHOD

(75) Inventor: Eckhard Braun, Rodgau (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/203,637

(22) PCT Filed: Feb. 22, 2001

(86) PCT No.: PCT/EP01/02036

§ 371 (c)(1),
(2), (4) Date: Oct. 23, 2002

(87) PCT Pub. No.: WO01/62509

PCT Pub. Date: Aug. 30, 2001

(65) Prior Publication Data

US 2003/0136847 A1    Jul. 24, 2003

(30) Foreign Application Priority Data

Feb. 25, 2000 (DE) .............................. 100 08 851

(51) Int. Cl.
*G06K 19/02* (2006.01)
(52) U.S. Cl. ............... 235/488; 235/472.01; 235/487; 235/86; 283/109; 283/114
(58) Field of Classification Search .......... 235/462.07, 235/488, 472.01, 487; 283/86, 109, 114; 264/1.34

See application file for complete search history.

(56) References Cited

U.S. PATENT DOCUMENTS

| 4,544,181 A | 10/1985 | Maurer et al. |
| 4,672,891 A * | 6/1987 | Maurer et al. ............. 101/32 |
| 4,732,410 A * | 3/1988 | Holbein et al. ............ 283/67 |
| 4,856,857 A | 8/1989 | Takeuchi et al. |
| 5,340,628 A | 8/1994 | McKillip |

(Continued)

FOREIGN PATENT DOCUMENTS

AU    600922    6/1988

(Continued)

OTHER PUBLICATIONS

EU-Kartenfuhrerschein: Sicherheitsmerkmale; http://www.bundesdruckerei.de/de/iddok/2__2/merkmale.html; visited Feb. 1, 2006.

(Continued)

*Primary Examiner*—Michael G. Lee
*Assistant Examiner*—Allyson N Trail
(74) *Attorney, Agent, or Firm*—Bacon & Thomas, PLLC

(57) ABSTRACT

The invention relates to a method for producing a data carrier having a laser-markable layer and a transparent optically variable layer overlapping therewith at least in certain areas, wherein visually visible markings that at least partly overlap with the optically variable layer are produced in the laser-markable layer after the application of the optically variable layer. The invention further includes a data carrier produced by the method and a semifinished product, such as a data carrier blank, that is provided for processing by the method.

27 Claims, 1 Drawing Sheet

U.S. PATENT DOCUMENTS

| | | | |
|---|---|---|---|
| 5,492,370 A | 2/1996 | Chatwin et al. | |
| 5,567,276 A | 10/1996 | Boehm et al. | |
| 5,706,266 A * | 1/1998 | Brownstein et al. | 369/53.21 |
| 5,801,857 A | 9/1998 | Heckenkamp et al. | |
| 5,817,205 A | 10/1998 | Kaule | |
| 5,843,547 A | 12/1998 | Kulper et al. | |
| 5,944,356 A | 8/1999 | Bergmann et al. | |
| 6,082,778 A * | 7/2000 | Solmsdorf | 283/82 |
| 6,183,018 B1 | 2/2001 | Braun et al. | |
| 6,248,973 B1 * | 6/2001 | Matsumura et al. | 219/121.69 |
| 6,372,394 B1 * | 4/2002 | Zientek | 430/10 |
| 6,491,324 B1 * | 12/2002 | Schmitz et al. | 283/82 |
| 6,581,840 B2 * | 6/2003 | Takeda et al. | 235/488 |
| 6,633,321 B1 * | 10/2003 | Maurer | 347/224 |
| 6,776,933 B1 * | 8/2004 | Chatwin et al. | 264/1.34 |
| 2002/0018430 A1 * | 2/2002 | Heckenkamp et al. | 369/109.01 |
| 2002/0074412 A1 * | 6/2002 | Stebbings et al. | 235/487 |
| 2002/0134842 A1 * | 9/2002 | Brunet | 235/487 |
| 2004/0091787 A1 * | 5/2004 | Sutehrland et al. | 430/1 |

FOREIGN PATENT DOCUMENTS

| | | |
|---|---|---|
| DE | 3048735 A1 | 8/1982 |
| DE | 19530495 | 2/1997 |
| DE | 19618569 A1 | 11/1997 |
| DE | 19716968 C1 | 12/1998 |
| EP | 0678400 A1 | 10/1995 |
| EP | 0741370 A1 | 11/1996 |
| EP | 892362 | 1/1999 |
| GB | 2130526 A | 6/1984 |
| GB | 2242161 | 9/1991 |
| JP | 186577 | 7/1995 |
| WO | 99/46133 | 9/1999 |

OTHER PUBLICATIONS

Neuer Eu-Fuhrerschein aus Makrofol/Falschungssicher und Unbefristet gultig; http://pc-films.de/pc-films/emea/de/pcfapplications/4570/article.jsp?docid=834; visited Feb. 3, 2006.

* cited by examiner

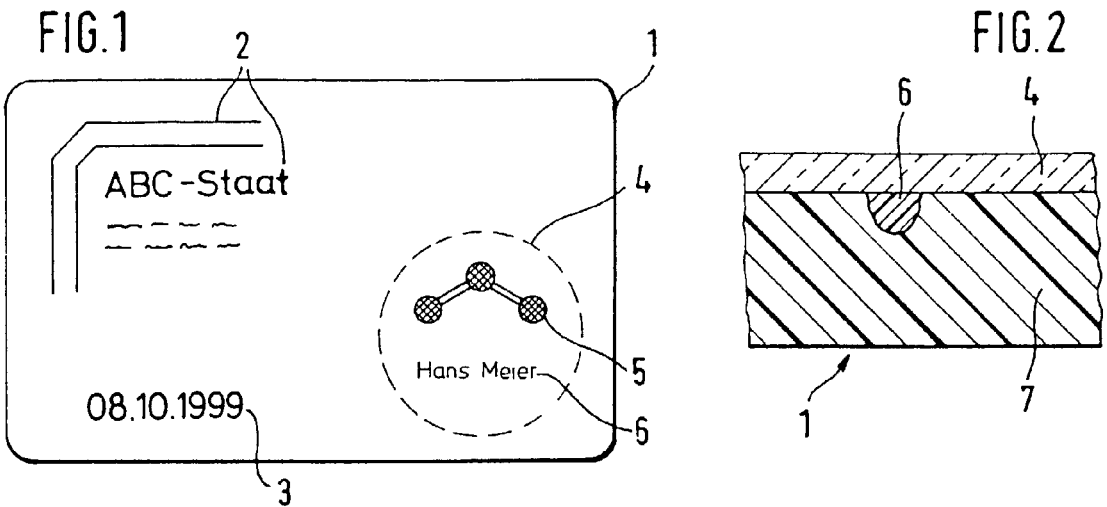
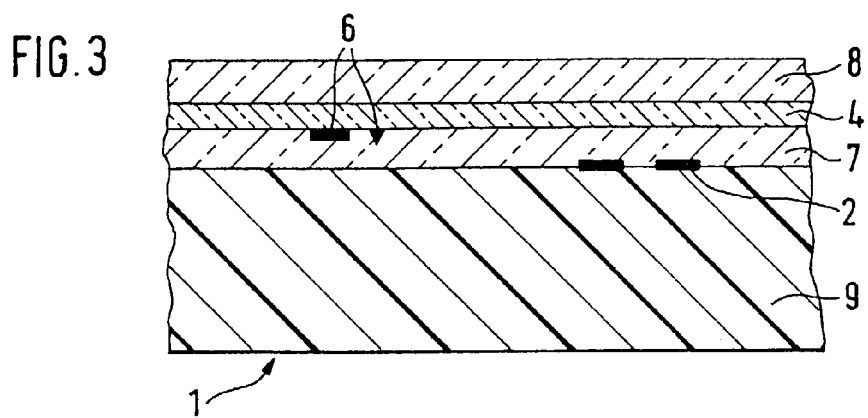
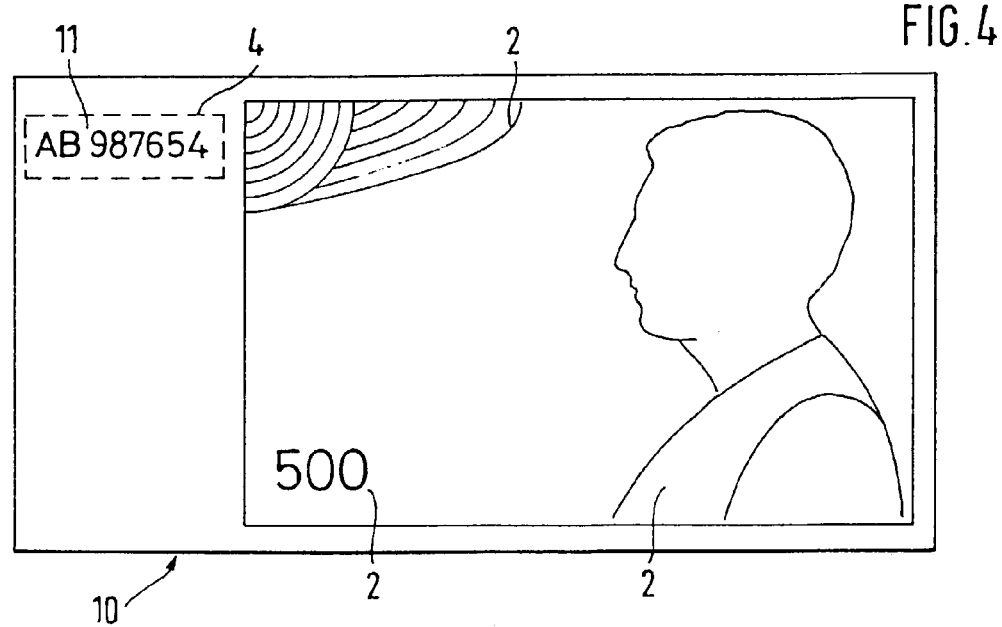

METHOD FOR PRODUCING LASER-WRITABLE DATA CARRIERS AND DATA CARRIER PRODUCED ACCORDING TO THIS METHOD

BACKGROUND OF THE INVENTION

This invention relates to a method for producing data carriers, in particular ID cards, papers of value and the like, in which the data carriers are provided with a security element having an optically variable layer and including markings produced by laser irradiation, and to data carriers produced by said method.

WO 97/19818 discloses printing data carriers with information that is rendered in a color contrasting with the data carrier. The accordingly printed areas are then covered with a transparent optically variable layer, the optically variable effect of said layer being clearly evident only in the areas where the printed information forms a dark and thus absorbent background. An optically variable effect is understood to mean that different visual impressions, for example different colors or tones, are produced at different viewing angles. This method has the disadvantage that a plurality of printing operations are necessary for producing the absorbent background and the optically variable layer, possibly with drying periods therebetween. If the printed information renders important data meriting protection, the data carriers produced by this method have little protection against forgery and manipulation since the printed information is easily accessible and manipulable.

SUMMARY OF THE INVENTION

The problem of the present invention is therefore to propose a simpler and thus also more economical method for producing data carriers with an optically variable security element and data carriers produced thereby, that furthermore offer elevated protection against forgery and manipulation.

The inventive method provides that the data carrier has a layer markable by laser radiation. Under the action of laser radiation, high-contrast and thus visually readily visible markings can be produced in said layer. On the side of the markable layer facing the viewer a transparent layer with optically variable properties is applied. The visually visible markings are then inscribed in the markable layer with a laser beam, the laser beam acting at least for some of the produced markings through the optically variable layer located thereabove. While the optically variable layer is largely transparent to the laser radiation and is not altered by the laser irradiation if the intensity is selected suitably, the beam energy is absorbed in the markable layer so that the irradiated areas of the markable layer undergo a color change and form visually well perceptible markings.

Since the optically variable layer is transparent, its optical impression is strongly influenced by the background. The markings produced by laser inscription are preferably dark or black so that the radiation passing through the optically variable layer is largely or completely absorbed. Therefore, the optically variable effect observable in reflected light of the optically variable layer located thereabove is especially evident in the area of the markings, while the optically variable layer hardly appears in the surroundings of the markings, in particular against a light or white background.

Since the optically variable layer is transparent to the laser radiation used, the inventive method offers the further advantage that the markings can be inscribed in the data carrier after the application of the optically variable layer through said layer. In this way, data carrier blanks can be provided with a uniform optically variable layer identical for all data carriers. The absorbent background that makes the optical effect of the optically variable layer become clearly visible can be produced later, so that the information content of the absorbent background need be fixed and assigned to each data carrier only at a very late time. Due to the simple and flexible controllability of the laser beam, the inventive security feature of each data carrier can be provided cost-effectively and simply with individual markings, i.e. an individual absorbent background.

The inventive method has in addition all advantages and assets of laser inscription. The accordingly produced markings can be incorporated safely and permanently into the volume of the data carrier and are not present on the surface, as is the case with simple prints. The markings produced by laser radiation are therefore especially well protected from manipulation and the inventive data carriers altogether more forgery-proof than ones produced by conventional printing methods. Laser inscription is preferably used to produce personal data of the owner of an ID card or paper of value. The inventive method is also suitable in particular for applying data carrier-specific, individual markings, such as serial numbers. Since the personalization or individualization of the data carrier can be performed as the last working step in the inventive method, only faultlessly prefabricated data carrier blanks reach personalization or individualization if there are suitable checks. If an error occurs during personalization, the personalization process, since it is effected as the last working step, can be repeated on a data carrier blank of the same series with little effort. Very elaborate and thus cost-intensive reproduction of a data carrier already provided with individual information in a multi-stage production and individualization process is unnecessary.

Since the individualization of a data carrier by laser inscription can be effected directly before issue of the data carrier, high-risk transport and forwarding routes from locally separate places of individualization and issue are in addition eliminated. The inventive method in addition allows a reduction of stockpiling of not yet individualized data carriers. Only the desired number of basic types of data carriers need be held in stock, which are then marked by incorporation of e.g. logos, symbols, serial numbers and the like by laser inscription in such a way that a division into sub- or partial groups or small series is effected only during the last working step. For example, a company can hold only one basic type of company ID card in stock at a central issuing office and indicate the ID card owner's affiliation with different subsidiaries or departments by incorporating group-specific characters or symbols, without having to hold a different type of company ID card or card blank in stock for each subsidiary or department.

Design features that all data carriers are to have can already be applied or incorporated in the working steps preceding the individualization by laser inscription. For these working steps, for example printing a uniform background pattern, one can then use especially economical methods and technologies suitable for large batches.

The inventive method is suitable in particular for data carriers, such as ID cards, membership cards, credit cards and money cards, driver's licenses and other papers of value and security documents such as bank notes, that are to be provided with information or data in such a way that they cannot be imitated by common means and are also protected from attempted manipulation. Laser inscription of the data carrier is preferably effected as the last processing step before its issue and is especially suitable for incorporating information that individualizes the data carrier within a series of like data carriers. The markings incorporated by laser radiation render for example personal data, such as name, date of birth, address or personnel number, but can also represent a serial number, signature or portrait or render national emblems, insignias of rank or company logos.

The optically variable layer is transparent. That is, the materials producing the optically variable effect and any filling, binding or supporting materials additionally present are largely transparent at least to the visually perceptible spectral region and the main emission wavelengths of the laser radiation used. Suitable optically variable materials are in particular crosslinked liquid crystal polymers, which can be present as a compact layer or in the form of pigments.

To facilitate handling and incorporation or application in/on the data carrier, the compact liquid crystal layers are preferably processed on a thin transparent plastic carrier layer, while pigments are processed together with transparent plastics into foils or lacquers. Instead of liquid crystal polymers, interference layer pigments can also be used for the optically variable layer. In any case it must be made sure that the pigments or other optically variable materials used have no, or little, inherent or body color. The possibilities of representing and rendering information are increased further if the area or the contour of the optically variable coating renders a character, logo or symbol. In particular screen printing, transfer printing and ink dabber printing are suitable for applying the optically variable layer. Embossing foils can also be used.

If the optically variable material is present as a compact layer, it can be glued onto the data carrier in advantageous and simple fashion. In this case it must be made sure that the gluing yields an undetachable compound between the glued-on layer and the data carrier.

Data carriers with an optically variable coating also have effective copy protection since the viewing-angle-dependent visual effect cannot be rendered by common reproduction methods, such as photocopying and prints with conventional inks.

For protection from environmental influences, abrasion and mechanical damage, the optically variable layer is preferably covered with a transparent protective or cover layer. For this purpose, a transparent lacquer layer or plastic film is applied as the outer final layer. In the case of protective foils, these are preferably connected with the data carrier permanently and safely under the action of pressure and heat by hot lamination.

Alternatively the inventive data carrier can also be produced by producing the marking by a laser in a first step and then applying the optically variable layer. This variant also offers the advantage that the marking is present within the volume of the data carrier in forgery-proof fashion.

BRIEF DESCRIPTION OF THE DRAWINGS

Further advantages and developments of the invention result from the dependent claims and the following description of preferred examples, whereby:

FIG. 1 shows a front view of an inventive card-shaped data carrier,

FIG. 2 shows a section through the layer structure of an inventive data carrier, FIG. 3 shows a section through a further inventive data carrier, FIG. 4 shows an inventive data carrier in the form of a bank note.

DESCRIPTION OF THE INVENTION

FIG. 1 shows ID card 1 in a front view. The card base is printed with general, nonindividual data 2. Further data 3 render the date of issue and have been incorporated by laser inscription. The area bordered by an interrupted line has been covered with optically variable layer 4. Markings 5, 6 incorporated by laser inscription are visible through the optically variable layer and render logo 5 and the ID card owner's name 6. Markings 3, 5 and 6 produced by laser beam action are black and strongly absorbent for light of the visible spectral region. They stand out against the light background of the card base with visually well perceptible contrast. Against this light background, transparent optically variable layer 4 hardly stands out, however, and is poorly perceptible in the unmarked areas. The optically variable layer is well perceptible with the naked eye and produces different color effects at different viewing angles only in the areas where markings 5, 6 form a dark, absorbent background. If special liquid crystal pigments are used, markings 5, 6 appear for example green upon perpendicular viewing while they are perceived as blue or black at a flat viewing angle. General print data 2 and date of issue 3 produced by laser inscription always look the same independently of the viewing angle, on the other hand, since they were produced in a partial area not covered with optically variable layer 4.

FIG. 2 shows the layer structure of preferred, very simply constructed data carrier 1. The base of data carrier 1 consists of self-supporting layer 7, which preferably consists, of plastic and can be sensitized by the admixture of small quantities of substances that are strongly absorbent for the wavelength of the inscription laser. Optically variable layer 4 is located on layer 7 markable by laser radiation. The action of a laser beam through largely transparent layer 4 has produced dark, absorbent marking 6 in markable layer 7. The viewing-angle-dependent effect of optically variable layer 4 appears in clearly perceptible fashion only in the area of marking 6. If markable layer 7 is largely transparent to wavelengths of the visible spectral region, marking 6 can fundamentally also be produced by laser irradiation of the side of the data carrier that was not provided with optically variable layer 4.

A cross section through the layer structure of a further preferred data carrier is shown in FIG. 3, whereby this figure, like FIG. 2, is a schematic diagram not necessarily rendering the correct layer thickness relations. The shown detail of data carrier 1 consists of carrier layer 9, which is preferably executed as an opaque layer and colored white. Materials to be used for the carrier layer are above all the plastic film materials customary in card production. It is also possible to use paper, in particular security paper. General print data 2 have been applied to carrier layer 9. Carrier layer 9 bears layer 7 markable by laser radiation, which is formed as a thin transparent foil in the transparent foil in the present example. The side of layer 7 facing the viewer bears optically variable layer 4. Layer 4 is printed on by screen printing for example as a lacquer layer containing optically variable pigments. The last layer is external transparent protective layer 8 that protects the layers therebelow from environmental influences, mechanical damage and abrasion. Protective layer 8 is preferably applied by hot lamination. Additional adhesive layers, in particular hot-melt adhesive layers, can optionally be provided to improve the adhesion between the individual layers. After completion of the layer structure, markings 6 can be produced in markable layer 7 by laser irradiation, said markings not being accessible from the card surface since they are produced in the interior or within the volume of the data carrier. Since layers 8, 4 and 7 are transparent, laser markings 6 as well as print data 2 are readily recognizable to the viewer.

FIG. 4 shows inventive data carrier 10 in the form of a bank note. The printed bank note substrate preferably consists of security paper and has been printed by the printing processes customary in bank-note printing with general, nonindividual data 2, which in FIG. 4 render the denomination 500, a portrait and a background pattern. Each bank note is individualized by serial number 11 that has been produced by laser inscription. The area where serial number 11 is present has optically variable layer 4. To permit laser inscription to be performed, the bank note substrate, i.e. the data carrier base, is provided with a laser-markable coating at least in the area where the serial number is provided. This can be done for example by applying a lacquer sensitized to laser radiation e.g. by the addition of small quantities of extremely fine carbon black pigments. It is also possible to suitably select the material of the base or to modify it by suitable additions so that it can be marked or inscribed with laser beams itself without any additional coating.

The invention claimed is:

1. A method for producing a data carrier with an optically variable security element having at least one visually recognizable marking and at least one transparent optically variable layer, the optically variable layer including a material producing an optically variable effect, and being disposed in an overlapping relationship with the marking at least in partial areas of the marking, comprising the steps: applying the transparent optically variable layer to a base of the data carrier, and then producing the marking in a lasermarkable layer of the data carrier through the optically variable layer by the action of a laser beam, the optically variable layer not being altered by the laser radiation.

2. The method according to claim 1, wherein the optically variable layer is printed on.

3. The method according to claim 2, wherein the printing process is selected from the group consisting of screen printing, transfer printing and ink dabber printing.

4. The method according to claim 1, wherein the data carrier is additionally provided with a transparent protective layer.

5. The method according to claim 4, wherein the optically variable layer is laminated in between the base of the data carrier and the transparent protective layer.

6. The method according to claim 1, wherein the optically variable layer is applied at least partially and up to all over the data carrier.

7. The method according to claim 1, wherein the optically variable layer is applied in the outline form of a symbol, character or logo.

8. The method according to claim 1, wherein the optically variable layer is a material containing optically variable pigments and the material is selected from the group consisting of a lacquer layer and a foil.

9. The method according to claim 8, wherein the optically variable pigments are selected from the group consisting of interference layer pigments and pigments that contain crosslinked liquid crystal polymers.

10. The method according to claim 1, wherein the marking is produced using a laser whose main emission wavelength is in the infrared or visible spectral region.

11. The method according to claim 1, wherein the laser beam produces a dark marking that is in readily visible contrast with marking's immediate surroundings.

12. A data carrier comprising a transparent optically variable layer and a further layer markable through the optically variable layer by laser radiation, the markable layer having visually recognizable markings produced by laser radiation, and the optically variable layer including a material producing an optically variable effect, and being disposed on the side of the laser-markable layer facing the viewer and overlapping with the markings at least in partial areas;

wherein the optically variable layer is formed of a material containing optically variable pigments and consists of a transparent lacquer layer.

13. The data carrier according to claim 12, wherein the markings are dark and form a visually well perceptible contrast with the marking's immediate surroundings.

14. The data carrier according to claim 12, wherein the markings represent alphanumeric characters, images or logos.

15. The data carrier according to claim 12, the markings render user-related data.

16. The data carrier according to claim 12, wherein the data carrier is a bank note and the markings render a serial number.

17. The data carrier according to claim 12, wherein the optically variable layer covers the data carrier at least in a partial area.

18. The data carrier according to claim 17, wherein the optically variable layer is applied in the outline form of a character, logo or symbol.

19. The data carrier according to claim 12 wherein the data carrier includes an external transparent protective layer.

20. The data carrier according to claim 19, wherein the optically variable layer is laminated in between the transparent protective layer and a base of the data carrier.

21. The data carrier according to claim 12, wherein the optically variable pigments are pigments selected from the group consisting of interference layer pigments and pigments containing crosslinked liquid crystal polymers.

22. A semifinished product for producing an individualized data carrier, said semifinished product having a layer markable by laser radiation and a transparent optically variable layer disposed on the side of the markable layer facing the viewer, wherein the markable layer and the optically variable layer overlap at least in partial areas, and visually recognizable markings are producable in the markable layer through the optically variable layer by the action of a laser beam, wherein the optically variable layer comprises a material producing an optically variable effect wherein the optically variable layer is formed of a material containing optically variable pigments and consists of a transparent lacquer layer.

23. The semifinished product according to claim 22, wherein the optically variable layer covers the product in at least a partial area.

24. The semifinished product according to claim 23, wherein the optically variable layer is applied in the outline form of a character, logo or symbol.

25. The semifinished product according to claim 22, wherein the semifinished product includes an external transparent protective layer.

26. The semifinished product according to claim 25, wherein the optically variable layer is laminated in between the transparent protective layer and a base of the product.

27. The semifinished product according to claim 17, wherein the optically variable pigments are pigments selected from the group consisting of interference layer pigments and pigments containing crosslinked liquid crystal polymers.

\* \* \* \* \*